(12) United States Patent
Zednicek et al.

(10) Patent No.: US 8,194,395 B2
(45) Date of Patent: Jun. 5, 2012

(54) HERMETICALLY SEALED CAPACITOR ASSEMBLY

(75) Inventors: Stanislav Zednicek, Lanskroun (CZ); Ladislav Vilc, Lanskroun (CZ); Martin Biler, Novy Jicin (CZ)

(73) Assignee: AVX Corporation, Myrtle Beach, SC (US)

( * ) Notice: Subject to any disclaimer, the term of this patent is extended or adjusted under 35 U.S.C. 154(b) by 219 days.

(21) Appl. No.: 12/575,627

(22) Filed: Oct. 8, 2009

(65) Prior Publication Data
US 2011/0085285 A1  Apr. 14, 2011

(51) Int. Cl.
*H01G 9/00*  (2006.01)
(52) U.S. Cl. ........ 361/523; 361/516; 361/519; 361/525; 361/528; 361/529
(58) Field of Classification Search .......... 361/516–519, 361/523–529, 530–531, 536–541; 29/25.01, 29/25.03
See application file for complete search history.

(56) References Cited

U.S. PATENT DOCUMENTS

| | | | |
|---|---|---|---|
| 3,345,545 | A | 10/1967 | Bourgault et al. |
| 3,922,773 | A | 12/1975 | Marien et al. |
| 4,085,435 | A | 4/1978 | Galvagni |
| 4,479,168 | A | 10/1984 | Green, Jr. |
| 4,755,908 | A | 7/1988 | Gardner |
| 4,910,645 | A | 3/1990 | Jonas et al. |
| 4,945,452 | A | 7/1990 | Sturmer et al. |
| 4,959,430 | A | 9/1990 | Jonas et al. |
| 5,111,327 | A | 5/1992 | Blohm et al. |
| 5,198,968 | A | 3/1993 | Galvagni |
| 5,300,575 | A | 4/1994 | Jonas et al. |
| 5,314,606 | A | 5/1994 | Irie et al. |
| 5,357,399 | A | 10/1994 | Salisbury |
| 5,394,295 | A | 2/1995 | Galvagni et al. |
| 5,457,862 | A | 10/1995 | Sakata et al. |
| 5,473,503 | A | 12/1995 | Sakata et al. |
| 5,495,386 | A | 2/1996 | Kulkarni |
| 5,586,000 | A | 12/1996 | Sakata et al. |
| 5,608,261 | A | 3/1997 | Bhattacharyya et al. |

(Continued)

FOREIGN PATENT DOCUMENTS

GB  1069685  8/1965

(Continued)

OTHER PUBLICATIONS

Related U.S. Patent Application Form.

(Continued)

*Primary Examiner* — Nguyen T Ha
(74) *Attorney, Agent, or Firm* — Dority & Manning, P.A.

(57) ABSTRACT

A capacitor assembly that includes an electrolytic capacitor that contains an anode body, dielectric overlying the anode, and a solid electrolyte overlying the dielectric is provided. An anode lead is also electrically connected to the anode body and extends in a longitudinal direction therefrom. The anode lead is connected to an "upstanding" portion of a leadframe. Among other things, this helps to limit substantial horizontal movement of the lead and thereby improve the mechanical robustness of the part. The capacitor and leadframe are enclosed and hermetically sealed within a ceramic housing in the presence of an inert gas. It is believed that the ceramic housing is capable of limiting the amount of oxygen and moisture supplied to the conductive polymer of the capacitor. In this manner, the solid electrolyte (e.g., conductive polymer) is less likely to undergo a reaction in high temperature environments, thus increasing the thermal stability of the capacitor assembly.

28 Claims, 2 Drawing Sheets

U.S. PATENT DOCUMENTS

| | | | |
|---|---|---|---|
| 5,638,253 A | 6/1997 | Hasegawa | |
| 5,694,287 A | 12/1997 | Nishiyama et al. | |
| 5,729,428 A | 3/1998 | Sakata et al. | |
| 5,786,980 A * | 7/1998 | Evans | 361/502 |
| 5,812,367 A | 9/1998 | Kudoh et al. | |
| 5,949,639 A | 9/1999 | Maeda et al. | |
| 5,951,840 A | 9/1999 | Fukaumi et al. | |
| 6,052,273 A | 4/2000 | Inoue et al. | |
| 6,191,936 B1 | 2/2001 | Webber et al. | |
| 6,197,252 B1 | 3/2001 | Bishop et al. | |
| 6,322,912 B1 | 11/2001 | Fife | |
| 6,369,239 B2 | 4/2002 | Rauchschwalbe et al. | |
| 6,391,275 B1 | 5/2002 | Fife | |
| 6,416,730 B1 | 7/2002 | Fife | |
| 6,527,937 B2 | 3/2003 | Fife | |
| 6,528,662 B2 | 3/2003 | Jonas | |
| 6,576,099 B2 | 6/2003 | Kimmel et al. | |
| 6,592,740 B2 | 7/2003 | Fife | |
| 6,635,729 B1 | 10/2003 | Groenendaal et al. | |
| 6,639,787 B2 | 10/2003 | Kimmel et al. | |
| 6,674,635 B1 | 1/2004 | Fife et al. | |
| 6,756,473 B2 | 6/2004 | Reuter et al. | |
| 6,891,016 B2 | 5/2005 | Reuter et al. | |
| 6,987,663 B2 | 1/2006 | Merker et al. | |
| 7,102,016 B2 | 9/2006 | Reuter | |
| 7,116,548 B2 | 10/2006 | Satterfield, Jr. et al. | |
| 7,118,690 B2 | 10/2006 | Wessling et al. | |
| 7,154,740 B2 | 12/2006 | Merker et al. | |
| 7,220,397 B2 | 5/2007 | Kimmel et al. | |
| 7,262,511 B2 | 8/2007 | Osako et al. | |
| 7,279,015 B2 | 10/2007 | Merker | |
| 7,304,832 B2 | 12/2007 | Ushio et al. | |
| 7,312,979 B2 | 12/2007 | Ishizuka et al. | |
| 7,341,705 B2 | 3/2008 | Schnitter | |
| 7,341,801 B2 | 3/2008 | Reuter et al. | |
| 7,358,326 B2 | 4/2008 | Heuer et al. | |
| 7,377,947 B2 | 5/2008 | Merker et al. | |
| 7,381,396 B2 | 6/2008 | Thomas et al. | |
| 7,411,779 B2 | 8/2008 | Merker et al. | |
| 7,419,926 B2 | 9/2008 | Schnitter et al. | |
| 7,449,588 B2 | 11/2008 | Jonas et al. | |
| 7,515,396 B2 | 4/2009 | Biler | |
| 7,554,793 B2 | 6/2009 | Chacko | |
| 7,563,290 B2 | 7/2009 | Qiu et al. | |
| 7,582,958 B2 | 9/2009 | Brailey | |
| 7,585,983 B2 | 9/2009 | Reuter et al. | |
| 7,688,571 B2 | 3/2010 | Ishizuka et al. | |
| 7,697,265 B2 | 4/2010 | Umemoto et al. | |
| 7,750,099 B2 | 7/2010 | Chikusa et al. | |
| 7,785,493 B2 | 8/2010 | Jonas et al. | |
| 7,826,200 B2 * | 11/2010 | Pascenko | 361/523 |
| 2001/0012193 A1 | 8/2001 | Watanabe et al. | |
| 2005/0065352 A1 | 3/2005 | Brassat et al. | |
| 2005/0167789 A1 | 8/2005 | Zhuang | |
| 2006/0035143 A1 | 2/2006 | Kida et al. | |
| 2006/0180797 A1 | 8/2006 | Merker et al. | |
| 2006/0260713 A1 | 11/2006 | Pyszczek et al. | |
| 2007/0064376 A1 | 3/2007 | Merker et al. | |
| 2008/0005878 A1 | 1/2008 | Merker et al. | |
| 2009/0030149 A1 | 1/2009 | Morita et al. | |
| 2009/0244812 A1 * | 10/2009 | Rawal et al. | 361/525 |
| 2009/0310285 A1 | 12/2009 | Reuter et al. | |
| 2009/0318710 A1 | 12/2009 | Brassat et al. | |
| 2010/0148124 A1 | 6/2010 | Reuter et al. | |
| 2010/0265634 A1 | 10/2010 | Freeman et al. | |

FOREIGN PATENT DOCUMENTS

| | | |
|---|---|---|
| JP | 3127813 | 5/1991 |
| JP | 11112157 | 4/1999 |
| JP | 2005217129 | 8/2005 |
| JP | 2006278875 | 10/2006 |
| WO | WO 2009030615 | 3/2009 |
| WO | WO 2009043648 | 4/2009 |
| WO | WO 2009047059 | 4/2009 |
| WO | WO 2009135752 | 11/2009 |
| WO | WO 2009141209 | 11/2009 |
| WO | WO 2010003874 | 1/2010 |
| WO | WO 2010015468 | 2/2010 |
| WO | WO 2010089111 | 8/2010 |
| WO | WO 2010102751 | 9/2010 |

OTHER PUBLICATIONS

Paper—Simpson et al., "Advances and Applications of Inherently Conductive Polymer Technologies Based on Poly(3,4-Ethylenedioxythiophene)," 2005 AIMCAL Fall Technical Conference and 19th International Vacuum Web Coating Conference, Oct. 16-20, 2005, Session 5: Advances in Technology, Myrtle Beach, SC, 10 pages.

Paper—Merker et al., "Conducting Polymer Dispersions for High-Capacitance Tantalum Capacitors,": CARTS Europe 2006, Sep. 2006, Bad Homburg, Germany, 6 pages.

Paper—Freeman et al., "Electrical Characterization of Polymer Tantalum Capacitors with Poly(3,4-Ethylenedioxythiophene) Cathode," Journal of the Electrochemical Society, vol. 156, No. 6, 2009, 10 pages.

Paper—Merker et al., "New Conducting Polymer Dispersions for Solid Electrolytic Capacitors," CARTS Europe 2005, Oct. 17-20, 2005, Prague, CZ Republic, 6 pages.

Paper—Young et al., "Performance and Reliability Study of High Voltage Tantalum Polymer Capacitors," 2010 Electronic Components Association, Inc., Arlington, VA; CARTS 2010 Conference Proceedings, CARTS 2010 Conference, New Orleans, LA, Apr. 2010, 13 pages.

Paper—Merker et al., "Tuning Conducting Polymer Dispersions for High-CV Tantalum Capacitors," CARTS Europe Oct. 29-Nov. 1, 2007, Barcelona, Spain, 6 pages.

Presentation—Freeman et al., "Hermetically Sealed Polymer Tantalum Capacitors," CMSE Europe 2010.

Machine Translation of JP 2006-278875A, 8 pages.
Abstract of Japanese Patent No. JP1140621 dated Jun. 1, 1989.
Abstract of Japanese Patent No. JP3109712 dated May 9, 1991.
Abstract of Japanese Patent No. JP3109713 dated May 9, 1991.
Abstract of Japanese Patent No. JP3109714 dated May 9, 1991.
Machine Translation of JP2005217129.

* cited by examiner

HERMETICALLY SEALED CAPACITOR ASSEMBLY

BACKGROUND OF THE INVENTION

Electrolytic capacitors (e.g., tantalum capacitors) are increasingly being used in the design of circuits due to their volumetric efficiency, reliability, and process compatibility. For example, one type of capacitor that has been developed is a solid electrolytic capacitor that includes an anode (e.g., tantalum), a dielectric oxide film (e.g., tantalum pentoxide, $Ta_2O_5$) formed on the anode, a solid electrolyte layer, and a cathode. The solid electrolyte layer may be formed from a conductive polymer, such as described in U.S. Pat. Nos. 5,457,862 to Sakata, et al., 5,473,503 to Sakata, et al., 5,729,428 to Sakata, et al., and 5,812,367 to Kudoh, et al. Unfortunately, however, the stability of such solid electrolytes is poor at high temperatures due to the tendency to transform from a doped to an un-doped state, or vice versa. As a result of the transformation, conductivity may decrease, which directly affects the capacitance and ESR and leads to performance degradation.

As such, a need currently exists for a solid electrolytic capacitor having improved performance in high temperature environments.

SUMMARY OF THE INVENTION

In accordance with one embodiment of the present invention, a capacitor assembly is disclosed that comprises an electrolytic capacitor comprising an anode body, dielectric, and solid electrolyte overlying the dielectric. An anode lead is electrically connected to the anode body and extends in a longitudinal direction therefrom. A first portion of a leadframe is positioned generally perpendicular to the longitudinal direction of the anode lead and connected thereto. The electrolytic capacitor and the first portion of the leadframe are positioned and hermetically sealed within a ceramic housing that defines an interior cavity having a gaseous atmosphere containing an inert gas. Furthermore, an anode termination is in electrical connection with the leadframe and a cathode termination that is in electrical connection with the solid electrolyte.

In accordance with another embodiment of the present invention, a method of forming a capacitor assembly is disclosed. The method comprises connecting an anode lead of an electrolytic capacitor to a first portion of a leadframe, wherein the first portion of the leadframe is positioned generally perpendicular to the longitudinal direction in which the anode lead extends. The electrolytic capacitor and the first portion of the leadframe are positioned within a ceramic housing. The solid electrolyte of the capacitor is electrically connected to a cathode termination and the leadframe is electrically connected to an anode termination. A lid is positioned over the ceramic housing. Further, the lid is hermetically sealed to the ceramic housing in the presence of a gaseous atmosphere containing an inert gas.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a capacitor assembly that includes an electrolytic capacitor that contains an anode body, dielectric overlying the anode, and a solid electrolyte overlying the dielectric. An anode lead is also electrically connected to the anode body and extends in a longitudinal direction therefrom. The anode lead is connected to an "upstanding" portion of a leadframe. Among other things, this helps to limit substantial horizontal movement of the lead and thereby improve the mechanical robustness of the part. The capacitor and leadframe are enclosed and hermetically sealed within a ceramic housing in the presence of an inert gas. It is believed that the ceramic housing is capable of limiting the amount of oxygen and moisture supplied to the conductive polymer of the capacitor. In this manner, the solid electrolyte (e.g., conductive polymer) is less likely to undergo a reaction in high temperature environments, thus increasing the thermal stability of the capacitor assembly.

Various embodiments of the present invention will now be described in more detail.

I. Electrolytic Capacitor

The anode body may be formed from a valve metal composition having a high specific charge, such as about 40,000 μF*V/g or more, in some embodiments about 50,000 μF*V/g or more, in some embodiments about 60,000 μF*V/g or more, and in some embodiments, from about 70,000 to about 700,000 μF*V/g. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. Nos. 6,322,912 to Fife; 6,391,275 to Fife et al.; 6,416,730 to Fife et al.; 6,527,937 to Fife; 6,576,099 to Kimmel, et al.; 6,592,740 to Fife, et al.; and 6,639,787 to Kimmel, et al.; and 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode body. In one embodiment, a tantalum or niobium oxide powder having a certain particle size is first selected. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

To facilitate the construction of the anode body, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), naphthalene, vegetable wax, microwaxes (purified paraffins), polymer binders (e.g., polyvinyl alcohol, poly(ethyl-2-oxazoline), etc), and so forth. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. If desired, any binder/lubricant may be removed after compression by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the anode body may be sintered to form a porous, integral mass. For example, in one embodiment, sintering may occur at a temperature of from about 1200° C. to about 2000° C., and in some embodiments, from about 1500° C. to about 1800° C. under vacuum or an inert atmosphere.

The thickness of the pressed anode body may be relatively thin, such as about 4 millimeters or less, in some embodiments, from about 0.05 to about 2 millimeters, and in some embodiments, from about 0.1 to about 1 millimeter. The shape of the anode body may also be selected to improve the electrical properties of the resulting capacitor. For example, the anode body may have a shape that is curved, sinusoidal, rectangular, U-shaped, V-shaped, etc. The anode body may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. Nos. 6,191,936 to Webber, et al.; 5,949,639 to Maeda, et al.; and 3,345,545 to Bourgault et al., as well as U.S. Patent Application Publication No. 2005/0270725 to Hahn, et al., all of which are incorporated herein in their entirety by reference thereto for all purposes.

An anode lead is also connected to the anode body and extends in a longitudinal direction therefrom. The anode lead may be in the form of a wire, sheet, etc., and may be formed from a valve metal compound, such as tantalum, niobium, niobium oxide, etc. Connection of the lead may be accomplished using known techniques, such as by welding the lead to the body or embedding it within the anode body during formation (e.g., prior to compaction and/or sintering).

The anode body may be anodized so that a dielectric is formed over and/or within the anode. Anodization is an electrochemical process by which the anode is oxidized to form a material having a relatively high dielectric constant. For example, a tantalum anode may be anodized to tantalum pentoxide ($Ta_2O_5$). Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to help achieve the desired oxide. In fact, water may constitute from about 50 wt. % or more, in some embodiments, about 70 wt. % or more, and in some embodiments, about 90 wt. % to 100 wt. % of the solvent(s) used in the electrolyte.

The electrolyte is ionically conductive and may have an ionic conductivity of about 1 milliSiemen per centimeter ("mS/cm") or more, in some embodiments about 30 mS/cm or more, and in some embodiments, from about 40 mS/cm to about 100 mS/cm, determined at a temperature of 25° C. To enhance the ionic conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

A current is passed through the electrolyte to form the dielectric. The value of voltage manages the thickness of the dielectric. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse or step potentiostatic methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric may be formed on a surface of the anode and within its pores.

Once the dielectric is formed, a protective coating may optionally be applied, such as one made of a relatively insulative resinous material (natural or synthetic). Such materials may have a specific resistivity of greater than about 10 Ω/cm, in some embodiments greater than about 100, in some embodiments greater than about 1,000 Ω/cm, in some embodiments greater than about $1 \times 10^5$ Ω/cm, and in some embodiments, greater than about $1 \times 10^{10}$ Ω/cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

Regardless, the part is subjected to a step for forming a solid electrolyte that functions as the cathode for the capacitor. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes. Alternatively, the solid electrolyte may be formed from one or more conductive polymer layers. The conductive polymer(s) employed in such layers are typically π-conjugated and have electrical conductivity after oxidation or reduction, such as an electrical conductivity of at least about 1 μS cm$^{-1}$ after oxidation. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Suitable polythiophenes may include, for instance, polythiophene and derivatives thereof, such as poly (3,4-ethylenedioxythiophene) ("PEDT"). In one particular embodiment, a polythiophene derivative is employed with recurring units of general formula (I) or formula (II) or recurring units of general formulae (I) and (II):

wherein,

A is an optionally substituted $C_1$ to $C_5$ alkylene radical (e.g., methylene, ethylene, n-propylene, n-butylene, n-pentylene, etc.);

R is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and x is an integer from 0 to 8, in some embodiments, from 0 to 2, and in some embodiments, x is 0. Example of substituents for the radicals "A" or "R" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

The total number of recurring units of general formula (I) or formula (II) or of general formulae (I) and (II) is typically from 2 to 2,000, and in some embodiments, from 2 to 100.

Particularly suitable polythiophene derivatives are those in which "A" is an optionally substituted $C_2$ to $C_3$ alkylene radical and x is 0 or 1. In one particular embodiment, the polythiophene derivative is PEDT and has recurring units of formula (II), wherein "A" is $CH_2$—$CH_2$ and "x" is 0. Methods for forming such polythiophene derivatives are well known in the art and described, for instance, in U.S. Pat. No. 6,987,663 to Merker, et al., which is incorporated herein in its entirety by reference thereto for all purposes. For example, the polythiophene derivatives may be formed from a monomeric precursor, such as optionally substituted thiophenes. Particularly suitable monomeric precursors are substituted 3,4-alkylenedioxythiophenes having the general formula (III), (IV) or a mixture of thiophene of general formulae (III) and (IV):

wherein, A, R, and X are as defined above.

Examples of such monomeric precursors include, for instance, optionally substituted 3,4-ethylenedioxythiophenes. Derivatives of these monomeric precursors may also be employed that are, for example, dimers or trimers of the above monomeric precursors. Higher molecular derivatives, i.e., tetramers, pentamers, etc. of the monomeric precursors are suitable for use in the present invention. The derivatives may be made up of identical or different monomer units and used in pure form and in a mixture with one another and/or with the monomeric precursors. Oxidized or reduced forms of these precursors may also be employed.

To produce the desired conductive polymer, monomeric precursors, such as described above, typically undergo oxidative polymerization in the presence of an oxidizing agent. The oxidizing agent may be a transition metal salt, such as a salt of an inorganic or organic acid that contain iron(III), copper(II), chromium(VI), cerium(IV), manganese(IV), manganese(VII), or ruthenium(III) cations. Particularly suitable transition metal salts include iron(III) cations, such as iron(III) halides (e.g., $FeCl_3$) or iron(III) salts of other inorganic acids, such as $Fe(ClO4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable for use in the present invention.

Various methods may be utilized to apply the solid electrolyte onto the anode part. In one embodiment, the oxidizing agent and monomeric precursor are applied, either sequentially or together, such that the polymerization reaction occurs in situ on the part. Suitable application techniques may include screen-printing, dipping, electrophoretic coating, and spraying, may be used to form a conductive polymer coating. As an example, the monomeric precursor (e.g., 3,4-ethylenedioxy-thiophene) may initially be mixed with the oxidizing agent to form a solution. One suitable oxidizing agent is CLEVIOS™ C, which is iron III toluene-sulfonate and sold by H.C. Starck. CLEVIOS™ C is a commercially available catalyst for CLEVIOS™ M, which is 3,4-ethylene dioxythiophene, a PEDT monomer also sold by H.C. Starck. Once the mixture is formed, the anode part may then be dipped into the solution so that the polymer forms on the surface of the anode part. Alternatively, the oxidizing agent and precursor may also be applied separately to the anode part. In one embodiment, for example, the oxidizing agent is dissolved in an organic solvent (e.g., butanol) and then applied to the anode part as a dipping solution. The anode part may then be dried to remove the solvent therefrom. Thereafter, the anode part may be dipped into a solution containing the appropriate monomer.

As the monomer contacts the surface of the anode part containing the oxidizing agent, it may chemically polymerize thereon. Polymerization may be performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Publication No. 2008/232037 to Biler. Still other methods for applying such conductive polymer coating(s) may be described in U.S. Pat. Nos. 5,457,862 to Sakata, et al., 5,473,503 to Sakata, et al., 5,729,428 to Sakata, et al., and 5,812,367 to Kudoh, et al., which are incorporated herein in their entirety by reference thereto for all purposes.

In addition to in situ application, the solid electrolyte may also be applied to the part in the form of a dispersion of solid conductive polymer particles. Although their size may vary, it is typically desired that the particles possess a small diameter to increase the surface area available for adhering to the anode part. For example, the particles may have an average diameter of from about 1 to about 500 nanometers, in some embodiments from about 5 to about 400 nanometers, and in some embodiments, from about 10 to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymers into a particulate form may be enhanced by using a separate counterion to counteract a charged conductive polymer (e.g., polythiophene). That is, the conductive polymer (e.g., polythiophene or derivative thereof) used in the solid electrolyte typically has a charge on the main polymer chain that is neutral or positive (cationic). Polythiophene derivatives, for instance, typically carry a positive charge in the main polymer chain. In some cases, the polymer may possess positive and negative charges in the structural unit, with the positive charge being located on the main chain and the negative charge optionally on the substituents of the radical "R", such as sultanate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to conductive polymers in a given layer of the solid electrolyte is typically from about 0.5:1 to about 50:1, in some embodiments from about 1:1 to about 30:1, and in some embodiments, from about 2:1 to about 20:1. The weight of the electrically conductive polymers corresponds referred to the above-referenced weight ratios refers to the weighed-in portion of the monomers used, assuming that a complete conversion occurs during polymerization.

In addition to conductive polymer(s) and optional counterion(s), the dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking.

Dispersion agents may also be employed to facilitate the formation of the solid electrolyte and the ability to apply it to the anode part. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in some embodiments from about 50 nanometers to about 50 micrometers, and in some embodiments, from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers.

Surface-active substances may also be employed in the dispersion, such as ionic or non-ionic surfactants. Furthermore, adhesives may be employed, such as organofunctional silanes or their hydrolysates, for example 3-glycidoxypropyltrialkoxysilane, 3-aminopropyl-triethoxysilane, 3-mercaptopropyltrimethoxysilane, 3-metacryloxypropyltrimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), an alcohols (e.g., ethylene glycol, glycerol, di- or triethylene glycol).

The polymeric dispersion may be applied by to the part using a variety of known techniques, such as by spin coating, impregnation, pouring, dropwise application, injection, spraying, doctor blading, brushing or printing (e.g., ink-jet, screen, or pad printing). Although it may vary depending on the application technique employed, the viscosity of the dispersion is typically from about 0.1 to about 100,000 mPas (measured at a shear rate of 100 s$^{-1}$), in some embodiments from about 1 to about 10,000 mPas, in some embodiments from about 10 to about 1,500 mPas, and in some embodiments, from about 100 to about 1000 mPas. Once applied, the layer may be dried and washed.

As indicated above, the solid electrolyte may be formed from one or multiple layers. When multiple layers are employed, they may be formed from a conductive polymer that is formed in situ and/or from a polymeric dispersion. Each layer may be formed using one or more coating steps. For example, the solid electrolyte may include a first conductive polymer layer that is in contact with the dielectric, such as a conductive polymer (e.g., PEDT) formed through in situ polymerization of an oxidizing agent and monomeric precursor. The solid electrolyte may also a second conductive polymer layer that generally overlies the first layer and may be formed from a dispersion of particles that contains a conductive polymer (e.g., PEDT), binder, and an optional counterion (e.g., PSS). One benefit of employing such a dispersion is that it may be able to penetrate into the edge region of the capacitor body to achieve good electrical contact with the inner layer and increase the adhesion to the capacitor body. This results in a more mechanically robust part, which may reduce equivalent series resistance and leakage current.

Regardless of the particular manner in which it is formed, the solid electrolyte may be healed upon application to the anode part. Healing may occur after each application of a solid electrolyte layer or may occur after the application of the entire coating if multiple layers are employed. In some embodiments, for example, the solid electrolyte may be healed by dipping the pellet into an electrolyte solution, such as a solution of acid, and thereafter applying a constant voltage to the solution until the current is reduced to a preselected level. If desired, such healing may be accomplished in multiple steps. After application of some or all of the layers described above, the resulting part may then be washed if desired to remove various byproducts, excess oxidizing agents, and so forth. Further, in some instances, drying may be utilized after some or all of the dipping operations described above. For example, drying may be desired after applying the oxidizing agent and/or after washing the pellet in order to open the pores of the part so that it can receive a liquid during subsequent dipping steps.

If desired, the part may optionally be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

II. Ceramic Housing

As indicated above, a ceramic housing is also provided in accordance with the present invention to enclose and hermetically seal the capacitor. Generally speaking, hermetic sealing of the capacitor within the ceramic housing occurs in the presence of a gaseous atmosphere that contains at least one inert gas so as to inhibit oxidation of the conductive polymer cathode during use. The inert gas may include, for instance, nitrogen, helium, argon, xenon, neon, krypton, radon, and so forth, as well as mixtures thereof. Typically, inert gases constitute the majority of the atmosphere within the ceramic housing, such as from about 50 wt. % to 100 wt. %, in some embodiments from about 75 wt. % to 100 wt. %, and in some embodiments, from about 90 wt. % to about 99 wt. % of the atmosphere. If desired, a relatively small amount of non-inert gases may also be employed, such as carbon dioxide, oxygen, water vapor, etc. In such cases, however, the non-inert gases typically constitute 15 wt. % or less, in some embodiments 10 wt. % or less, in some embodiments about 5 wt. % or less, in some embodiments about 1 wt. % or less, and in some embodiments, from about 0.01 wt. % to about 1 wt. % of the atmosphere within the ceramic housing. For example, the moisture content (expressed in terms of relatively humidity) may be about 10% or less, in some embodiments about 5% or less, in some embodiments about 1% or less, and in some embodiments, from about 0.01 to about 5%.

The ceramic housing may include one or more layers of a ceramic material, such as aluminum nitride, aluminum oxide, silicon oxide, magnesium oxide, calcium oxide, and so forth. The width and length of the ceramic housing may vary depending on the intended application. In one embodiment, for example, the length of the housing (-y direction in FIG. 1) is from about 2.0 to about 10.0 millimeters, in some embodiments from about 2.5 to about 8.0 millimeters, and in some embodiments, from about 3.0 to about 6.5 millimeters. The width of the housing may range from about 1.0 to about 5 millimeters, in some embodiments from about 1.5 to about 4.5 millimeters, and in some embodiments, from about 2.0 to about 3.5 millimeter. The overall height of the housing (-z direction in FIG. 1) may optionally remain small so that the resultant assembly is readily incorporated into low profile products. For example, the thickness of the housing may be about 5.0 millimeters or less, in some embodiments, from about 0.4 to about 3.5 millimeters, and in some embodiments, from about 0.5 to about 3.0 millimeters.

The manner in which the capacitor is electrically connected to the ceramic housing is selected to achieve a mechanically robust part that in turn has good electrical performance. More specifically, the anode lead is electrically connected to a leadframe that is positioned within the ceramic housing. The leadframe has an upstanding portion that connects to the lead and limits its movement in the horizontal direction. In this manner, the leadframe can both enhance surface contact and mechanical stability of the lead during use and thereby provide a robust part that achieves good electrical performance.

Figure 1:
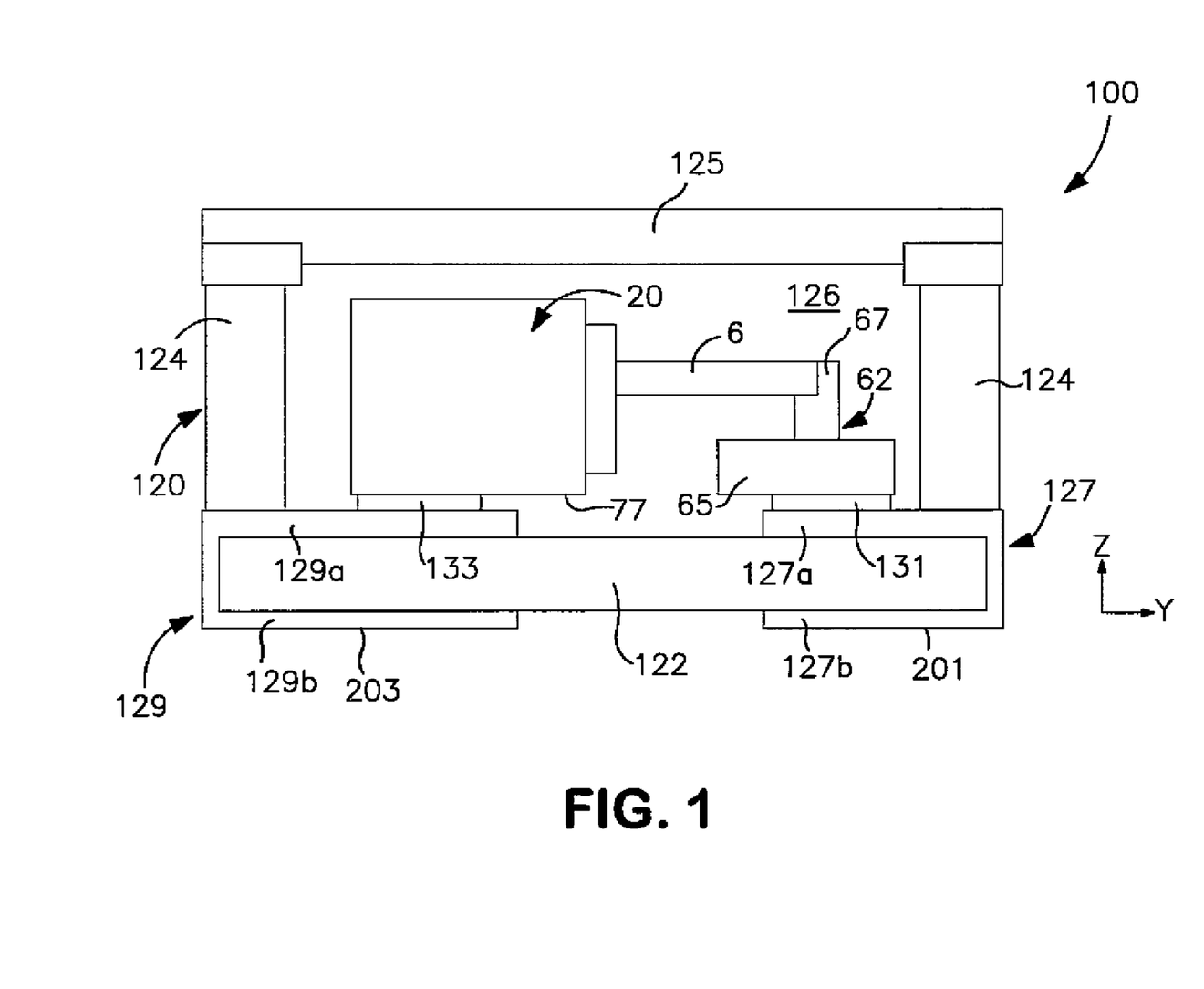
FIG. 1 is a cross-sectional view of one embodiment of a capacitor assembly of the assembly of the present invention.
Figure 2:
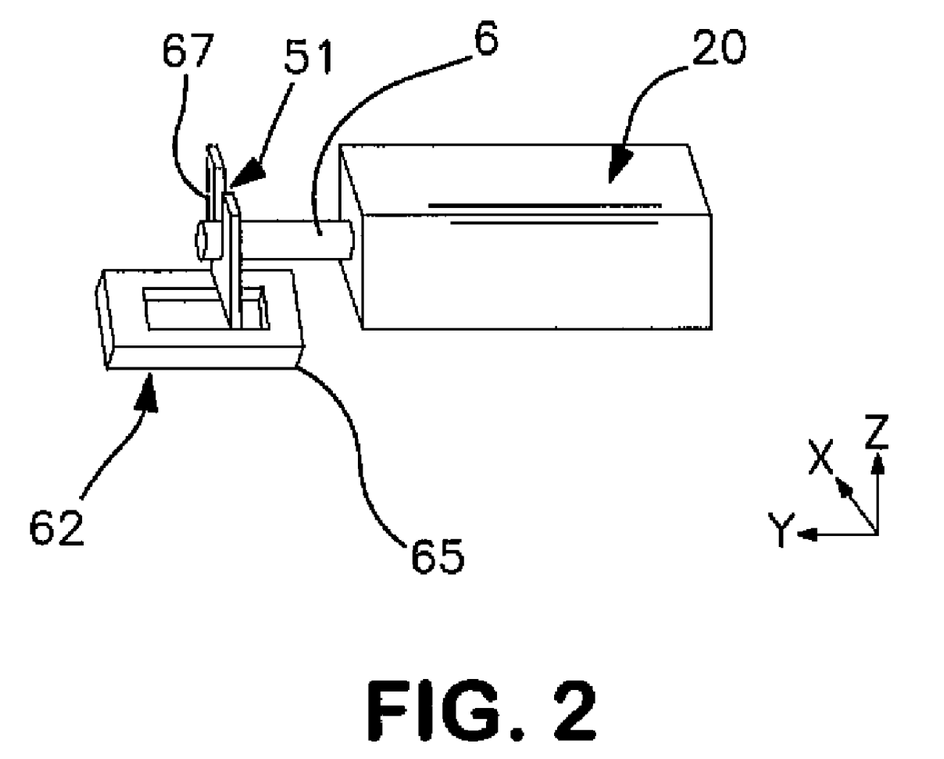
FIG. 2 is a perspective view of a leadframe in electrical connection with a capacitor in accordance with one embodiment of the present invention.

Referring to FIGS. 1-2, for example, one embodiment of a capacitor assembly 100 is shown that contains a ceramic housing 120 and an electrolytic capacitor 20. The capacitor assembly 100 also includes a leadframe 62 that is formed from a first portion 67 and a second portion 65. The first portion 67 and second portion 65 may be integral or separate pieces that are connected together, either directly or via an additional conductive element (e.g., metal). In the illustrated embodiment, the second portion 65 is provided in a plane that is generally parallel to a longitudinal direction in which the lead 6 extends (e.g., -y direction). The first portion 67 is "upstanding" in the sense that it is provided in a plane that is generally perpendicular the longitudinal direction in which the lead 6 extends. The first portion 67 of the leadframe 62 may also possess a mounting region 51 (see FIG. 2) that is connected to an anode lead 6. The region 51 may have a "U-shape" for further enhancing surface contact and mechanical stability of the lead 6. Connection of the region 51 to the lead 6 may be accomplished using any of a variety of known techniques, such as welding, laser welding, conductive adhesives, etc. In one particular embodiment, for example, the region 51 of the leadframe 62 is laser welded to the anode lead 6. Regardless of the technique chosen, however, the first portion 67 can hold the anode lead 6 in substantial horizontal alignment to further enhance the dimensional stability of the capacitor assembly 100.

External anode and cathode terminations (e.g., pins, pads, sheets, plates, frames, etc.) may also be employed for mounting the capacitor assembly onto a surface. The terminations may extend through the ceramic housing to connect with the leadframe and capacitor. The thickness or height of the terminations is generally selected to minimize the thickness of the capacitor assembly. For instance, the thickness of the terminations may range from about 0.05 to about 1 millimeter, in some embodiments from about 0.05 to about 0.5 millimeters, and from about 0.1 to about 0.2 millimeters. If desired, the surface of the terminations may be electroplated with nickel, silver, gold, tin, etc. as is known in the art to ensure that the final part is mountable to the circuit board. In one particular embodiment, the termination(s) are deposited with nickel and silver flashes, respectively, and the mounting surface is also plated with a tin solder layer. In another embodiment, the termination(s) are deposited with thin outer metal layers (e.g., gold) onto a base metal layer (e.g., copper alloy) to further increase conductivity.

Referring again to FIG. 1, one embodiment of the present invention is shown in which the leadframe 62 and capacitor 20 are connected to the ceramic housing 120 through anode and cathode terminations 127 and 129, respectively. More specifically, the ceramic housing 120 includes a lower wall 122 and two opposing sidewalls 124 between which a cavity 126 is formed that includes the capacitor 20. The lower wall 122 and sidewalls 124 are formed from one or more layers of a ceramic material such as described above. In this particular embodiment, the anode termination 127 contains a first region 127a that is positioned within the ceramic housing 120 and electrically connected to the leadframe 62 and a second region 127b that is positioned external to the housing 120 and provides a mounting surface 201. Likewise, the cathode termination 129 contains a first region 129a that is positioned within the ceramic housing 120 and electrically connected to the solid electrolyte of the electrolytic capacitor 20 and a second region 129b that is positioned external to the housing 120 and provides a mounting surface 203. It should be understood that the entire portion of such regions need not be positioned within or external to the housing.

Connection of the terminations 127 and 129 may be made using any known technique, such as welding, laser welding, conductive adhesives, etc. In one particular embodiment, for example, a conductive adhesive 131 is used to connect the leadframe 62 to the anode termination 127. Likewise, a conductive adhesive 133 is used to connect the cathode of the electrolytic capacitor 20 to the cathode termination 129. The conductive adhesives may be formed from conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osaka, et al., which is incorporated herein in its entirety by reference thereto for all purposes.

Of course, other techniques may also be employed to connect the terminations. In alternative embodiments, for example, the terminations may be connected to the ceramic housing via conductive traces that extend through the housing. Any conductive material may be employed to form the traces, such as a conductive metal (e.g., copper, nickel, silver, zinc, tin, palladium, lead, copper, aluminum, molybdenum, titanium, iron, zirconium, tungsten, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The traces may be formed using any known technique, such as by printing or coating an ink containing the metal onto a surface of the housing. Various techniques for providing conductive traces in a ceramic housing are described in more detail in U.S. Pat. Nos. 5,314,606 to Irie, et al. and 7,304,832 to Ushio, et al., as well as U.S. Patent Application Publication No. 2005/0167789 to Zhuang and 2007/0138606 to Brailey, all of which are incorporated herein in their entirety by reference thereto for all purposes.

Regardless of the manner in which the terminations are connected, the resulting package is hermetically sealed as described above. Referring to FIG. 1, for instance, a lid 125 may be placed on an upper surface of the side walls 124 after the capacitor 20 is positioned within the ceramic housing 120. The lid 125 may be formed from a ceramic, metal (e.g., iron, copper, nickel, cobalt, etc., as well as alloys thereof), and so forth. In one embodiment, for example, the lid contains a Kovar® alloy (Carpenter Technology Corporation), which is a nickel-cobalt ferrous alloy. The size of the housing 120 is generally such that the lid 125 does not contact any surface of the capacitor 20 so that it is not contaminated. When placed in the desired position, the lid 125 is hermetically sealed to the sidewalls 124 using known techniques, such as welding (e.g., resistance welding, laser welding, etc.), soldering, etc. Hermetic sealing generally occurs in the presence of inert gases as described above so that the resulting assembly is substantially free of reactive gases, such as oxygen or water vapor.

Although not required, other layers and/or materials may also be employed in the ceramic housing 120. For example, one or more barrier members (not shown) may be formed on the lower wall 122, sidewall(s) 124, and/or lid 125 to inhibit damage to the capacitor 20 during hermetic sealing of the assembly. The barrier member(s) may be formed from any materials known in the art, such as antireflection materials that are capable of preventing a laser beam from being reflected. Examples of such materials may include polymers, such as epoxy resins, polyimides, polyolefins (e.g., polyethylene or polypropylene), optionally containing filler particles (e.g., black pigment).

As a result of the present invention, the capacitor assembly may exhibit excellent electrical properties even when exposed to high temperature environments. For example, the capacitor assembly may have an equivalence series resistance ("ESR") of less than about 50 ohms, in some embodiments less than about 25 ohms, in some embodiments from about 0.01 to about 10 ohms, and in some embodiments, from about 0.05 to about 5 ohms, measured at an operating frequency of 100 Hz. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 $\mu A/\mu F*V$, in some embodiments less than about 0.5 $\mu A/\mu F*V$, and in some embodiments, less than about 0.1 $\mu A/\mu F*V$, where $\mu A$ is microamps and $\mu F*V$ is the product of the capacitance and the rated voltage. Such ESR and normalized leakage current values may even be maintained after aging for a substantial amount of time at high temperatures. For example, the values may be maintained for about 100 hours or more, in some embodiments from about 300 hours to about 3000 hours, and in some embodiments, from about 400 hours to about 2500 hours (e.g., 500 hours, 600 hours, 700 hours, 800 hours, 900 hours, 1000 hours, 1100 hours, 1200 hours, or 2000 hours) at temperatures ranging from about 100° C. to about 250° C., and, in some embodiments from about 100° C. to about 225° C., and in some embodiments, from about 100° C. to about 225° C. (e.g., 100° C., 125° C., 150° C., 175° C., or 200° C.).

The present invention may be better understood by reference to the following examples.

Test Procedures

Equivalent Series Resistance (ESR) and Capacitance:

Equivalence series resistance was measured using a Keithley 3330 Precision LCZ meter with Kelvin Leads with 0 volts bias and 1 volt signal. The operating frequency was 100 kHz. Capacitance was measured using a Keithley 3330 Precision LCZ meter with Kelvin Leads with 2 volts bias and 1 volt signal. The operating frequency was 120 Hz and the temperature was 23° C.±2° C.

Leakage Current:

Leakage current ("DCL") was measured using a MC 190 Leakage test set made by Mantracourt Electronics LTD, UK. The MC 190 test measures leakage current at a temperature of 25° C. and at a certain rated voltage after 10 seconds.

EXAMPLE

Initially, 100 capacitor element samples were formed from tantalum anodes having a size of 1.65×2.70×2.85 mm. Each anode was embedded with a tantalum wire, sintered at 1500° C., and pressed to a density of 5.3 g/cm³. To anodize the tantalum anode, it was dipped into an orthophosphoric acid/water solution having a conductivity of 8.6 mS/cm and temperature of 85° C. Fifty (50) of the samples were then dipped sequentially into a solution of iron(III) p-toluenesulfonate solution in n-butanol (CLEVIOS CB40, H.C. Starck) and into a solution of 3,4-ethylenedioxythiophene (CLEVIOS M, H.C. Starck) and polymerized to achieve a PEDOT conductive polymer cathode. The remaining fifty (50) samples were dipped into a conventional aqueous solution of manganese(II) nitrate and dried to achieve an $MnO_2$ cathode. All one hundred (100) parts were then dipped sequentially into a graphite dispersion and in a silver dispersion and dried.

The tantalum wire of each of the resulting capacitor elements was then laser welded to a cut-out portion of a lead frame as shown in FIG. 1. The lead frame was made of copper based material (for the PEDOT cathode samples) or NILO based material (for the $MnO_2$ cathode samples). The resulting capacitor element/lead frame systems were then cured at 195° C. for 60 seconds.

Ceramic packages were also obtained Kyocera America, Inc. of San Diego, Calif. under the name "Cap Pak." The lead frame was first glued to a gold anode termination inside the container (see FIG. 1) and thereafter the cathode portion of the capacitor was glued to a gold cathode termination (see FIG. 1). The adhesive employed for the anode termination was a silver-loaded epoxy adhesive ("Epo-Tek" from Polytec PT, a single component, silver-filled epoxy with 80% silver flakes) and the adhesive employed for the cathode termination was a silver-loaded epoxy adhesive (Protavic America, single component, silver-filled epoxy with 70% silver flakes). The resulting assembly was then heated in a convection oven preset at 150° C. for 60 minutes to cure the adhesive. After curing, a Kovar® metal lid was placed over the top of the container so that there was no direct contact between the interior surface of the lid and the exterior surface of the attached capacitor. The resulting assembly was then placed into a welding chamber and purged with nitrogen gas for 120 minutes before seam welding at 60° C. was performed. No burn-in or healing was performed after the seam welding.

Upon formation, the parts (without and without the hermetic packaging) were placed in air at 200° C. for shelf testing. After 2000 hours, the leakage current (DCL), equivalent series resistance (ESR), and capacitance of the parts were determined at room temperature (23° C.±2° C.) to verify whether the part had shown any degradation.

The results are set forth below.

| 10 μF/35 V | Initial | 200° C., 2000 hrs, 0.5 Ur | | Changes | |
|---|---|---|---|---|---|
| | | PEDOT cathode | | | With |
| | | Without Hermetic Pack. | With Hermetic Pack. | Without Hermetic Pack. | Hermetic Pack. |
| CAP [μF] | 9.7 ± 1.1 | 1.5 ± 4.4 | 9.1 ± 1.9 | −84% | −6% |
| ESR [Ω] | 0.09 ± 0.06 | 1.31 ± 0.51 | 0.16 ± 0.09 | +1.22 | +0.07 |
| DCL [μF] | 0.9 ± 0.5 | 3.5 ± 2.5 | 3.7 ± 2.4 | +2.6 | +2.8 |

| 10 μF/35 V | Initial | 200° C., 2000 hrs, 0.5 Ur | | Changes | |
|---|---|---|---|---|---|
| | | $MnO_2$ cathode | | | With |
| | | Without Hermetic Pack. | With Hermetic Pack. | Without Hermetic Pack. | Hermetic Pack. |
| CAP [μF] | 9.9 ± 0.7 | 9.8 ± 1.1 | 9.5 ± 1.3 | −1% | −4% |
| ESR [mΩ] | 0.36 ± 0.12 | 0.51 ± 0.19 | 0.40 ± 0.16 | +0.15 | +0.04 |
| DCL [μF] | 0.10 ± 0.04 | 0.13 ± 0.05 | 0.12 ± 0.05 | +0.03 | +0.02 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A capacitor assembly comprising:
    an electrolytic capacitor comprising an anode body, dielectric, and solid electrolyte overlying the dielectric, wherein an anode lead is electrically connected to the anode body and extends in a longitudinal direction therefrom;
    a leadframe containing a first portion that is positioned generally perpendicular to the longitudinal direction of the anode lead and connected thereto;
    a ceramic housing within which the electrolytic capacitor and the first portion of the leadframe are positioned and hermetically sealed, the ceramic housing defining an interior cavity having a gaseous atmosphere, the gaseous atmosphere containing an inert gas;
    an anode termination that is in electrical connection with the leadframe; and
    a cathode termination that is in electrical connection with the solid electrolyte.

2. The capacitor assembly of claim 1, wherein the anode is formed from a valve metal composition.

3. The capacitor assembly of claim 2, wherein the valve metal composition includes tantalum or niobium oxide.

4. The capacitor assembly of claim 1, wherein the solid electrolyte includes a conductive polymer.

5. The capacitor assembly of claim 4, wherein the conductive polymer is a polypyrrole, polythiophene, polyaniline, polyacetylene, poly-p-phenylene, polyphenolate, or a combination thereof.

6. The capacitor assembly of claim 4, wherein the conductive polymer is poly(3,4-ethylenedioxythiophene).

7. The capacitor assembly of claim 1, wherein the inert gas includes nitrogen, helium, argon, xenon, neon, krypton, radon, or combinations thereof.

8. The capacitor assembly of claim 1, wherein inert gases constitute from about 50 wt. % to 100 wt. % of the gaseous atmosphere.

9. The capacitor assembly of claim 1, wherein inert gases constitute from about 75 wt. % to 100 wt. % of the gaseous atmosphere.

10. The capacitor assembly of claim 1, wherein oxygen constitutes less than about 1 wt. % of the gaseous atmosphere.

11. The capacitor assembly of claim 1, wherein the leadframe further comprises a second portion that is generally parallel to the longitudinal direction in which the anode lead extends.

12. The capacitor assembly of claim 11, wherein a conductive adhesive electrically connects the second portion of the leadframe to the anode termination.

13. The capacitor assembly of claim 11, wherein the second portion is positioned within the ceramic housing.

14. The capacitor assembly of claim 1, wherein a conductive adhesive electrically connects the solid electrolyte to the cathode termination.

15. The capacitor assembly of claim 1, wherein a first region of the anode termination is positioned within the ceramic housing and a second region of the anode termination is positioned external to the ceramic housing.

16. The capacitor assembly of claim 1, wherein a first region of the cathode termination is positioned within the ceramic housing and a second region of the cathode termination is positioned external to the ceramic housing.

17. The capacitor assembly of claim 1, wherein the first portion of the leadframe is connected to the anode lead by a weld.

18. The capacitor assembly of claim 1, wherein the first portion of the leadframe contains a U-shaped mounting region that receives the anode lead.

19. The capacitor assembly of claim 1, further comprising a lid that is welded or soldered to the ceramic housing.

20. A method of forming a capacitor assembly, the method comprising:
providing an electrolytic capacitor comprising an anode body, dielectric overlying the anode body, and solid electrolyte overlying the dielectric, wherein an anode lead is electrically connected to the anode body and extends in a longitudinal direction therefrom;
connecting the anode lead to a first portion of a leadframe, wherein the first portion of the leadframe is positioned generally perpendicular to the longitudinal direction in which the anode lead extends;
positioning the electrolytic capacitor and the first portion of the leadframe within a ceramic housing;
electrically connecting the solid electrolyte of the capacitor to a cathode termination;
electrically connecting the leadframe to an anode termination;
positioning a lid over the ceramic housing; and
hermetically sealing the lid to the ceramic housing in the presence of a gaseous atmosphere containing an inert gas.

21. A capacitor assembly comprising:
an electrolytic capacitor comprising an anode body that includes tantalum or niobium oxide, dielectric, and solid electrolyte overlying the dielectric, the solid electrolyte including a polypyrrole, polythiophene, polyaniline, polyacetylene, poly-p-phenylene, polyphenolate, or a combination thereof, wherein an anode lead is electrically connected to the anode body and extends in a longitudinal direction therefrom;
a leadframe containing a first portion that is positioned generally perpendicular to the longitudinal direction of the anode lead and connected thereto;
a housing within which the electrolytic capacitor and the first portion of the leadframe are positioned and hermetically sealed, the housing defining an interior cavity having a gaseous atmosphere, the gaseous atmosphere containing an inert gas;
an anode termination that is in electrical connection with the leadframe; and
a cathode termination that is in electrical connection with the solid electrolyte.

22. The capacitor assembly of claim 21, wherein the conductive polymer is poly(3,4-ethylenedioxythiophene).

23. The capacitor assembly of claim 22, wherein inert gases constitute from about 75 wt. % to 100 wt. % of the gaseous atmosphere.

24. The capacitor assembly of claim 22, wherein the leadframe further comprises a second portion that is generally parallel to the longitudinal direction in which the anode lead extends.

25. The capacitor assembly of claim 24, wherein the second portion is positioned within the housing.

26. The capacitor assembly of claim 22, wherein a first region of the anode termination is positioned within the housing and a second region of the anode termination is positioned external to the housing.

27. The capacitor assembly of claim 22, wherein a first region of the cathode termination is positioned within the housing and a second region of the cathode termination is positioned external to the housing.

28. The capacitor assembly of claim 22, further comprising a lid that is welded or soldered to the housing.

* * * * *